(12) United States Patent
Pichler et al.

(10) Patent No.: US 7,005,507 B2
(45) Date of Patent: Feb. 28, 2006

(54) AZO DYES, A PROCESS FOR THEIR PREPARATION AND THEIR USE IN THE DYEING OR PRINTING OF HYDROPHOBIC FIBER MATERIALS

(75) Inventors: Yvonne Pichler, Bretzwil (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 73 days.

(21) Appl. No.: 10/470,039

(22) PCT Filed: Jan. 18, 2002

(86) PCT No.: PCT/EP02/00513

§ 371 (c)(1),
(2), (4) Date: Jul. 23, 2003

(87) PCT Pub. No.: WO02/059216

PCT Pub. Date: Aug. 1, 2002

(65) Prior Publication Data

US 2004/0055097 A1    Mar. 25, 2004

(30) Foreign Application Priority Data

Jan. 26, 2002    (EP) .................. 01810079

(51) Int. Cl.
*C09B 29/42*    (2006.01)
*D06P 1/18*    (2006.01)

(52) U.S. Cl. .................. 534/766; 534/773; 8/662; 8/920

(58) Field of Classification Search .............. 534/766, 534/773; 8/662
See application file for complete search history.

(56) References Cited

U.S. PATENT DOCUMENTS

| | | | |
|---|---|---|---|
| 3,853,895 A | 12/1974 | Lamm et al. | 260/294.9 |
| 4,146,535 A | 3/1979 | Dehnert et al. | 260/156 |
| 4,276,045 A | 6/1981 | Juenemann et al. | 8/471 |
| 4,473,499 A * | 9/1984 | Niwa et al. | 534/637 |
| 4,515,716 A * | 5/1985 | Niwa et al. | 534/635 |
| 5,602,238 A | 2/1997 | Schaetzer | 534/766 |

FOREIGN PATENT DOCUMENTS

| | | |
|---|---|---|
| DE | 2718619 | 11/1978 |
| EP | 0023315 | 2/1981 |
| EP | 0548715 | 6/1993 |
| EP | 0579192 | 1/1994 |
| EP | 0659841 | 6/1995 |
| FR | 2329724 | 5/1977 |
| GB | 2002409 | 2/1979 |
| GB | 1598893 | 9/1981 |
| JP | 58-052359 | * 3/1983 |

* cited by examiner

*Primary Examiner*—Fiona T. Powers
(74) *Attorney, Agent, or Firm*—Kevin T. Mansfield

(57) ABSTRACT

The present invention relates to an azo dye of formula (1), wherein $R_1$ is the radical of a diazo component of the benzene, naphthalene, diphenyl, azobenzene, thiophene, benzothiazole, thiadiazole, indazole, benzatriazole, pyrazole, anthraquinone, naphtholic acid imide, chromone, phthalimide or diphenylene oxide series, $R_2$ is an unsubstitued or substitued aryl radical or an unsubstituted or substituted aralkyl radical and $R_3$ is an unsubstituted or substituted aryl radical or an unsubstituted or substituted aralkyl radical, with the proviso that one of the substituents $R_2$ and $R_3$ is an unsubstituted or substituted aryl radical and the other is an unsubstituted or substituted aralkyl radical, 2-hydroxy-2-phenylethyl being expected as a substituted aralkyl radical, to mixtures comprising at least two structually different azo dyes of formula (1) and to the use of those azo dyes and dye mixtures in the dyeing or printing of semi-synthetic or synthetic hydrophobic fibre materials.

5 Claims, No Drawings

AZO DYES, A PROCESS FOR THEIR PREPARATION AND THEIR USE IN THE DYEING OR PRINTING OF HYDROPHOBIC FIBER MATERIALS

The present invention relates to azo dyes, to their preparation and to their use in the dyeing or printing of semi-synthetic or synthetic hydrophobic fibre materials.

Azo dyes and their use in the dyeing of semi-synthetic or synthetic hydrophobic fibre materials are known. It has been shown, however, that such dyes do not always fully satisfy the highest demands, especially in respect of high temperature light fastness and/or colour strength. There is therefore a need for new dyes that yield tinctorially strong, alkali-stable dyeings or prints having high temperature light fastness and that exhibit good allround properties.

It has now been found, surprisingly, that the azo dyes according to the invention meet the criteria given above to a considerable degree.

The present invention accordingly relates to an azo dye of formula

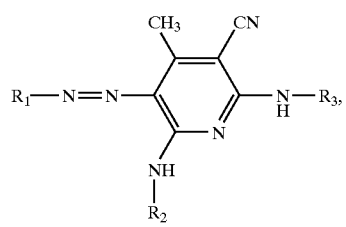

(1)

wherein $R_1$ is the radical of a diazo component of the benzene, naphthalene, diphenyl, azobenzene, thiophene, benzothiazole, benzisothiazole, thiadiazole, indazole, benzotriazole, pyrazole, anthraquinone, naphtholic acid imide, chromone, phthalimide or diphenylene oxide series, $R_2$ is an unsubstituted or substituted aryl radical or an unsubstituted or substituted aralkyl radical and $R_3$ is an unsubstituted or substituted aryl radical or an unsubstituted or substituted aralkyl radical, with the proviso that one of the substituents $R_2$ and $R_3$ is an unsubstituted or substituted aryl radical and the other is an unsubstituted or substituted aralkyl radical, 2-hydroxy-2-phenyl-ethyl being excepted as a substituted aralkyl radical.

Of the substituents $R_1$, the radicals of a diazo component of the benzene, naphthalene and thiophene series are preferred.

Especially preferred as $R_1$ is the radical of a diazo component of the benzene series. The aryl radicals denoted by $R_2$ and $R_3$ may be mono- or poly-substituted, especially mono- to tri-substituted, e.g. by $C_1$–$C_4$alkyl, $C_1$–$C_4$alkoxy or halogen.

Preferably, the aryl radicals denoted by $R_2$ and $R_3$ are unsubstituted or substituted by methyl, methoxy, chlorine or fluorine.

The aryl radicals denoted by $R_2$ and $R_3$ are especially substituted by methyl in the ortho-position and, more especially, the meta-position to the amino group.

The radicals $R_2$ and $R_3$ are very especially unsubstituted.

A preferred aryl radical for $R_2$ and $R_3$ is phenyl.

$C_1$–$C_4$Alkyl as a substituent of $R_2$ and/or $R_3$ may be, for example, methyl, ethyl, propyl, isopropyl, n-butyl, isobutyl, sec-butyl or tert-butyl.

$C_1$–$C_4$Alkoxy as a substituent of $R_2$ and/or $R_3$ is e.g. methoxy, ethoxy, propoxy or butoxy.

A preferred aralkyl radical for $R_2$ and $R_3$ is phenyl-$C_1$–$C_4$alkyl, especially 2-phenylethyl or benzyl.

The phenyl radical in phenyl-$C_1$–$C_4$alkyl can itself be mono- or poly-substituted by the substituents indicated above for "aryl radicals".

Preferably, the phenyl radical in phenyl-$C_1$–$C_4$alkyl does not itself carry substituents.

Halogen as a substituent of $R_2$ and/or $R_3$ is bromine, fluorine or especially chlorine.

The azo dyes of the following formulae are important:

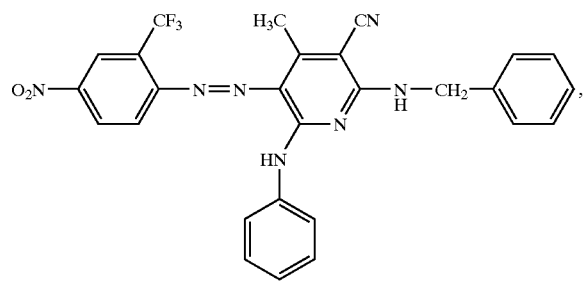

(2)

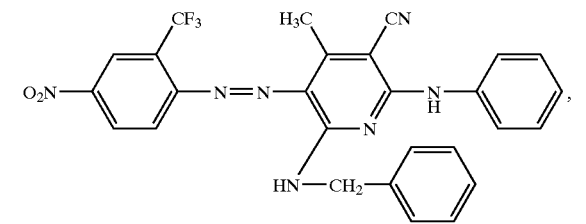

(3)

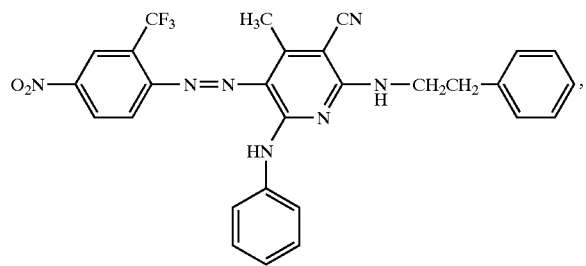

(4)

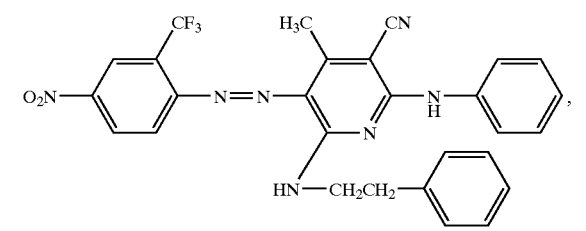

(5)

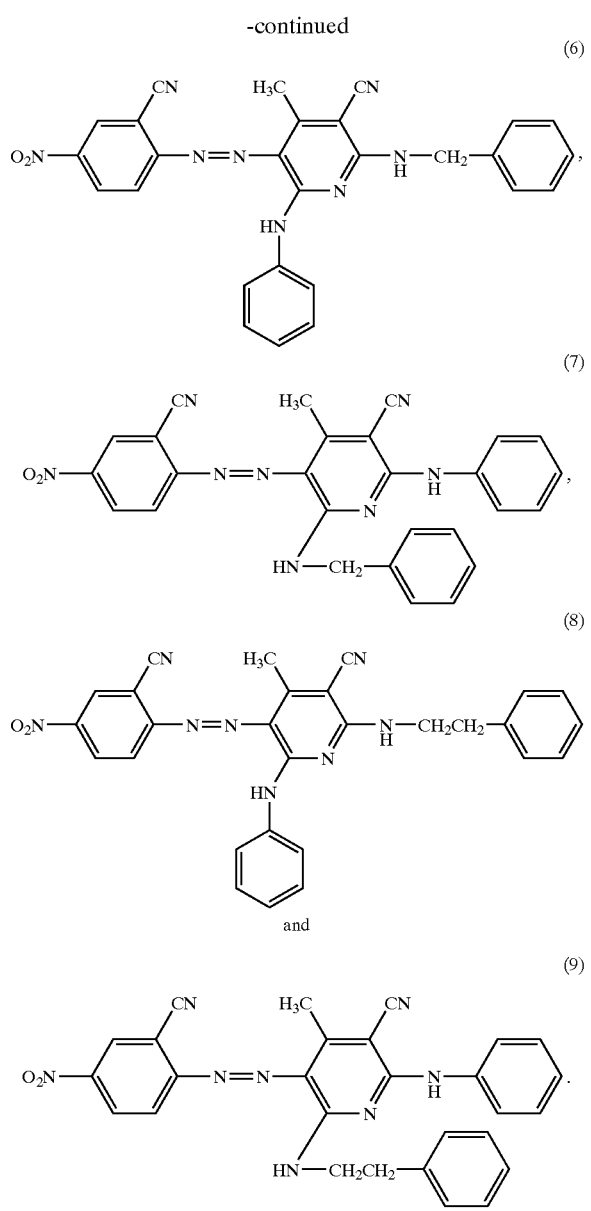

The present invention relates also to dye mixtures comprising at least two structurally different azo dyes of formula (1).

Preference is given to dye mixtures comprising two structurally different azo dyes of formula (1).

Special preference is given to dye mixtures comprising the azo dyes of formulae (2) and (3), (4) and (5), (6) and (7), and (8) and (9).

The amount of the individual dyes in the dye mixtures according to the invention may vary within wide limits from e.g. 95:5 to 5:95 parts by weight, especially from 70:30 to 30:70 parts by weight, more especially from 55:45 to 45:55 parts by weight, of the individual dyes in a dye mixture comprising two azo dyes according to the invention.

Very special preference is given to dye mixtures comprising the following structurally different azo dyes of formula (1):
A. azo dyes of formulae (2), (3), (4) and (5), and
B. azo dyes of formulae (6), (7), (8) and (9).

The amounts of the azo dyes in dye mixture A. may likewise vary within wide limits, preference being given to dye mixtures in which the sum of the azo dyes of formulae (2) and (3) and the sum of the azo dyes of formulae (4) and (5) varies in a ratio by weight between 95:5 and 5:95, especially between 70:30 and 30:70, more especially between 55:45 and 45:55, the definitions and preferences given above for the dye mixture comprising two azo dyes according to the invention applying also to the ratio of the azo dyes of formulae (2) and (3), and (4) and (5).

The amounts of the azo dyes in dye mixture B. may likewise vary within wide limits, preference being given to dye mixtures in which the sum of the azo dyes of formulae (6) and (7) and the sum of the azo dyes of formulae (8) and (9) varies in a ratio by weight between 95:5 and 5:95, especially between 70:30 and 30:70, more especially between 55:45 and 45:55, the definitions and preferences given above for the dye mixture comprising two azo dyes according to the invention applying also to the ratio of the azo dyes of formulae (6) and (7), and (8) and (9).

The present invention relates also to the process for the preparation of the azo dyes of formula (1) according to the invention.

The dyes are prepared, for example, as follows: a compound of formula

is diazotised in accordance with a customary procedure and then coupled to a coupling component of formula

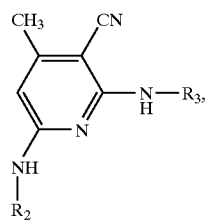

wherein $R_1$, $R_2$ and $R_3$ are as defined above for formula (1).

The diazotisation of the compound of formula (50) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. using nitrosylsulfuric acid. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (50) to the coupling component of formula (51) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The compounds of formula (50) are known or can be prepared in a manner known per se. The coupling components of formula (51) are also known or can be prepared in a manner known per se.

A dye mixture comprising two structurally different azo dyes of formula (1) can be prepared, for example, as follows: a compound of formula

  (50)

is diazotised in accordanc with a customary procedure and then coupled to a coupling component mixture comprising the compounds of formulae

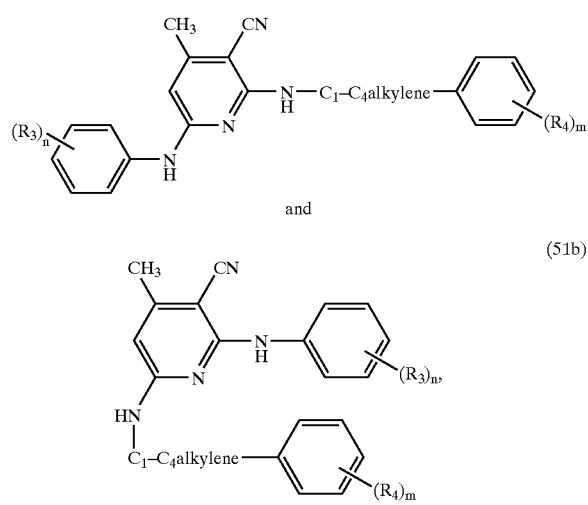

wherein $R_1$, $R_2$ and $R_3$ are as defined above for formula (1) and $R_4$ has the same meanings as $R_3$ independently of $R_3$ and n and m are the numbers 1, 2 or 3.

The above coupling component mixture can be prepared, for example, as follows: a compound of formula

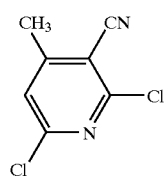  (52)

is reacted first with a compound of formula

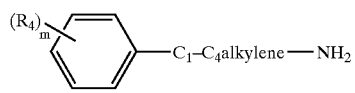  (53)

and then with a compound of formula

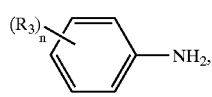  (54)

wherein $R_3$, $R_4$, n and m are as defined above.

From the resulting coupling component mixture, the individual coupling component(s) of formula (51) or formulae (51a) and (51b) can be obtained by subsequent chromatographic separation.

The dye mixtures comprising four structurally different azo dyes of formula (1) can be prepared, for example, by simply mixing together two of the two-component dye mixtures described above, e.g. a mixture comprising the azo dyes of formulae (2) and (3) and a mixture comprising the azo dyes of formulae (4) and (5).

The azo dyes and dye mixtures according to the invention can be used in the dyeing and printing of semi-synthetic and, especially, synthetic hydrophobic fibre materials, more especially textile materials. Textile materials composed of blends that contain such semi-synthetic and/or synthetic hydrophobic textile materials can likewise be dyed or printed using the azo dyes or dye mixtures according to the invention.

Semi-synthetic textile materials that come into consideration are especially cellulose secondary acetate and cellulose triacetate. Synthetic hydrophobic textile materials consist especially of linear, aromatic polyesters, for example those of terephthalic acid and glycols, especially ethylene glycol, or condensation products of terephthalic acid and 1,4-bis (hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the azo dyes and dye mixtures according to the invention to the textile materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose secondary acetate is dyed preferably at about from 65 to 85° C. and cellulose triacetate at temperatures of up to 115° C.

The azo dyes and dye mixtures according to the invention will not colour wool and cotton present at the same time in the dyebath or will colour such materials only slightly (very good reservation), so that they can also be used satisfactorily in the dyeing of polyester/wool and polyester/cellulosic fibre blend fabrics.

The azo dyes and dye mixtures according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile material can be in a variety of processing forms, e.g. in the form of fibres, yarns or non-wovens, in the form of woven fabrics or knitted fabrics.

It is advantageous to convert the azo dyes and dye mixtures according to the invention into a dye preparation prior to use. For this purpose, the azo dyes are ground so that their particle size is on average from 0.1 to 10 microns. The grinding can be carried out in the presence of dispersants. For example, the dried azo dye is ground with a dispersant or is kneaded in paste form with a dispersant and then dried in vacuo or by atomisation. The preparations so obtained can be used, after the addition of water, to prepare printing pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The azo dyes and dye mixtures according to the invention impart to the mentioned materials, especially to polyester material, level colour shades having very good in-use fastness properties, such as, especially, good fastness to light, more especially very good high temperature light fastness, fastness to thermofixing, to pleating, to chlorine and to wetting, such as fastness to water, perspiration and washing; the finished dyeings are also distinguished by good fastness to rubbing.

The azo dyes and dye mixtures according to the invention can also be used satisfactorily in the preparation of mixed shades together with other dyes.

The azo dyes and dye mixtures according to the invention can be used especially as a suitable component in a trichromatic dyeing or printing technique.

In the process for trichromatic dyeing of semi-synthetic or synthetic hydrophobic fibre materials there is used at least one red-dyeing azo dye of formula

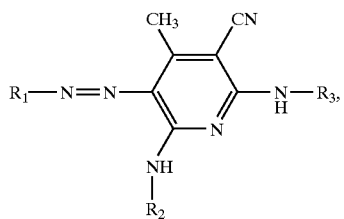
(1)

wherein $R_1$ is the radical of a diazo component of the benzene, naphthalene, diphenyl, azobenzene, thiophene, benzothiazole, benzisothiazole, thiadiazole, indazole, benzotriazole, pyrazole, anthraquinone, naphtholic acid imide, chromone, phthalimide or diphenylene oxide series, $R_2$ is an unsubstituted or substituted aryl radical or an unsubstituted or substituted aralkyl radical and $R_3$ is an unsubstituted or substituted aryl radical or an unsubstituted or substituted aralkyl radical, with the proviso that one of the substituents $R_2$ and $R_3$ is an unsubstituted or substituted aryl radical and the other is an unsubstituted or substituted aralkyl radical, 2-hydroxy-2-phenylethyl being excepted as a substituted aralkyl radical, optionally in combination with further red dyes, e.g. C.I. Disperse Red 086, C.I. Disperse Red 279, Dianix Rot HF-LS (Dystar) or Palanil Rot FFB (BASF), at least one blue-dyeing dye of formula

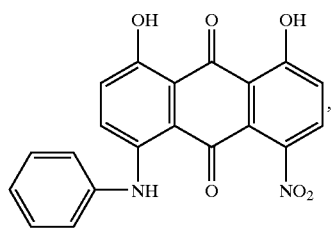
(10)

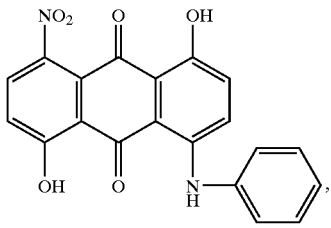
(11)

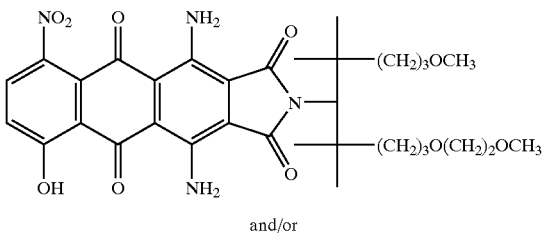
(12)

and/or

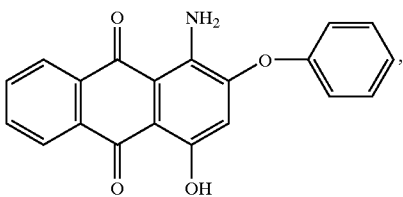
(13)

and at least one yellow-dyeing dye of formula

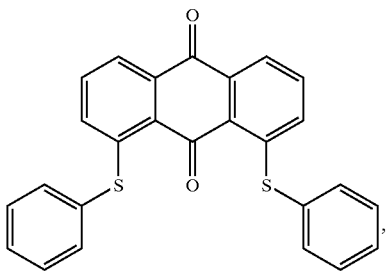
(14)

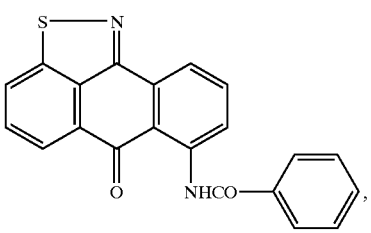
(15)

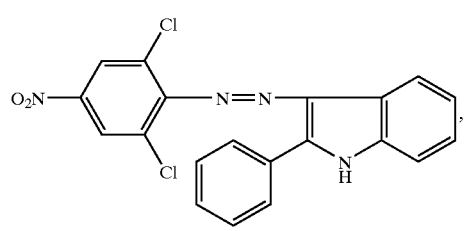
(16)

-continued (17)

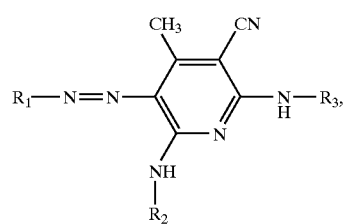

and/or (18)

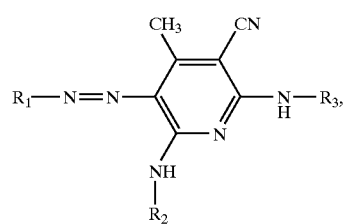

The dyes of formulae (10) to (18) are known or can be prepared analogously to known compounds in accordance with procedures known per se.

The definitions and preferences given above apply also to the red-dyeing azo dye of formula (1).

Trichromatic dyeing is the additive colour mixing of suitably selected yellow- or orange-dyeing, red-dyeing and blue-dyeing dyes with which any desired shade of the visible colour spectrum can be achieved by an appropriate choice of the relative proportions of the dye components.

In a preferred embodiment of the trichromatic process according to the invention, a dye mixture comprising the red-dyeing azo dyes of formulae (2), (3), (4) and (5) together with the blue-dyeing dyes of formulae (10) and (11) and the yellow-dyeing dye of formula (12) is used.

In a further preferred embodiment of the trichomatic process according to the invention, a dye mixture comprising the red-dyeing azo dyes of formula (6), (7), (8) and (9) together with the blue-dyeing dyes of formulae (10) and (11) and the yellow-dyeing dye of formula (12) is used.

The present invention relates also to a trichromatic mixture comprising at least one red-dyeing azo dye of formula

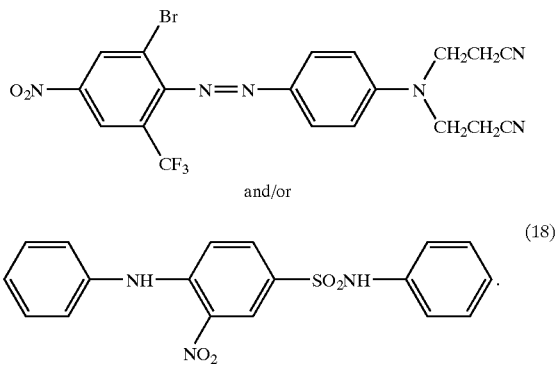

(1)

wherein $R_1$ is the radical of a diazo component of the benzene, naphthalene, diphenyl, azobenzene, thiophene, benzothiazole, benzisothiazole, thiadiazole, indazole, benzotriazole, pyrazole, anthraquinone, naphtholic acid imide, chromone, phthalimide or diphenylene oxide series, $R_2$ is an unsubstituted or substituted aryl radical or an unsubstituted or substituted aralkyl radical and $R_3$ is an unsubstituted or substituted aryl radical or an unsubstituted or substituted aralkyl radical, with the proviso that one of the substituents $R_2$ and $R_3$ is an unsubstituted or substituted aryl radical and the other is an unsubstituted or substituted aralkyl radical, 2-hydroxy-2-phenylethyl being excepted as a substituted aralkyl radical, at least one blue-dyeing dye of formulae (10) to (13) and at least one yellow-dyeing dye of formulae (14) to (18).

The definitions and preferences given above apply also to the red-dyeing azo dye of formula (1).

The azo dyes and dye mixtures according to the invention are also very suitable for dyeing hydrophobic textile material from supercritical $CO_2$.

The present invention relates also to the above-mentioned use of the azo dyes and dye mixtures according to the invention as well as to a process for the dyeing or printing of semi-synthetic or synthetic hydrophobic fibre material, especially textile material, which process comprises applying the azo dyes or dye mixtures according to the invention to the said material or incorporating them into that material. The said hydrophobic fibre material is preferably textile polyester material. Further substrates that can be treated by the process according to the invention and also preferred process conditions can be found above in the detailed description of the use of the azo dyes and dye mixtures according to the invention. The invention relates also to hydrophobic fibre material, especially polyester textile material, dyed or printed by the said process.

The azo dyes and dye mixtures according to the invention are also suitable for modern reproduction processes, e.g. thermotransfer printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

EXAMPLE 1

A. In a Laboratory Reaction Apparatus,
with stirring and with cooling at a temperature of from 20 to 30° C., 27.80 g of 2-amino-5-nitro-benzonitrile are introduced into 40.00 g of a 97% sulfuric acid and stirring is carried out for 30 minutes. A further 10.00 g of a 97% sulfuric acid are then added to the resulting suspension, with stirring, and the reaction mass is stirred for a further 30 minutes and cooled to about from 5 to 15° C. 47.70 g of a 40% nitrosylsulfuric acid are then added dropwise and the resulting solution is then stirred for 2 hours at from 10 to 20° C.

B. In a Laboratory Reaction Apparatus,
76.00 g of powdered 2,6-dichloro-3-cyano-4-methylpyridine are suspended in 250.00 ml of triethylamine and the suspension is heated to from 50 to 55° C. At that temperature, 49.00 g of phenethylamine are added dropwise and the mixture is stirred at 60° C. for 12 hours. The temperature is then increased to about from 80 to 90° C., and the triethylamine is separated off by distillation for about 10 hours. 100.00 ml of aniline are then added dropwise to the resulting solution and the solution is stirred at 150° C. for 12 hours. 450.00 ml of a 4N HCl are then added and the reaction mass is poured into 150.00 g of ice and stirred for about 3.5 hours, filtered with suction, washed with 6.00 litres of water and dried.

C. In a Laboratory Reaction Apparatus,
63.30 g of the coupling component mixtur prepared under B. are introduced into a mixture of 250.00 ml of a 2N HCl and 200.00 ml of water. The resulting suspension is stirred for 1 hour, then filtered with suction and washed with water and the resulting filter cake is introduced into 200.00 ml of a 80% acetic acid.

100.00 ml of ethyl alcohol are added to the resulting suspension; the mixture is cooled to about 0° C. and the diazo solution prepared under A. is added dropwise in the course of 30 minutes at a temperature of <8° C.

The resulting very viscous reaction mass is diluted with 150.00 ml of water and stirred for 3 hours at from 5 to 10° C.

The precipitated reaction product is then filtered off with suction, washed with water and dried.

76.60 g of a dye mixture consisting of the azo dyes of formulae

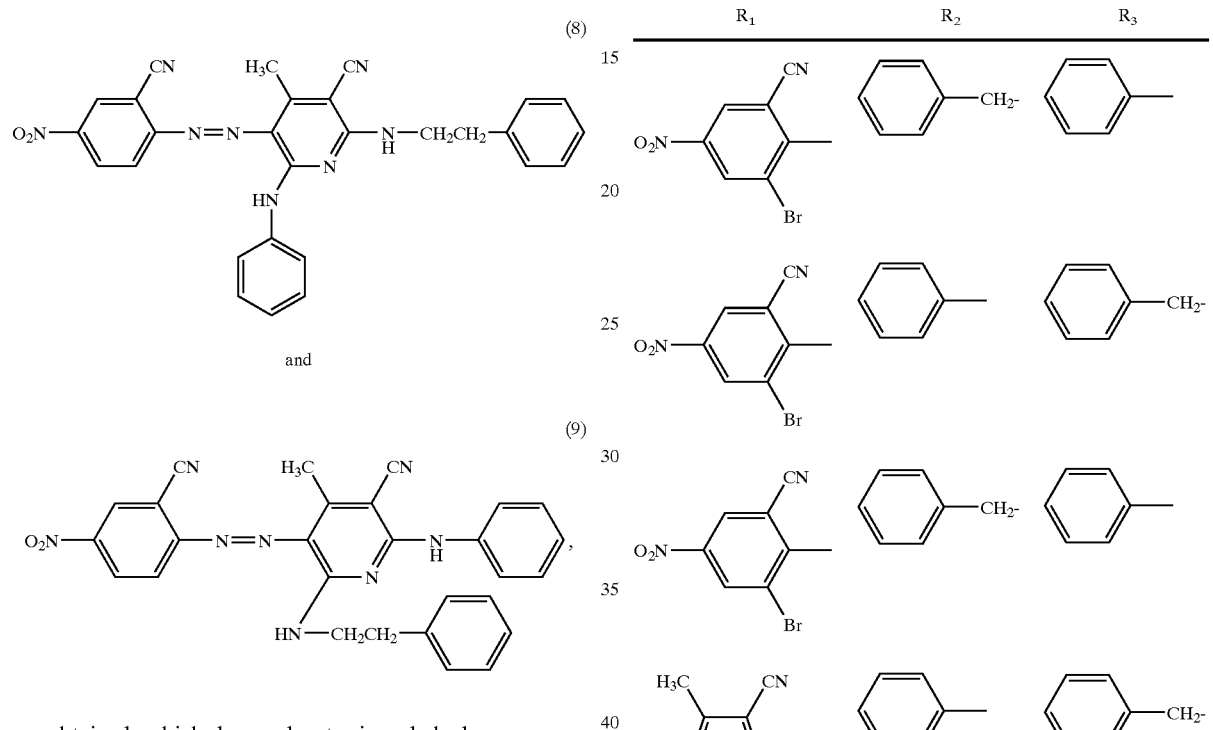

are obtained, which dyes polyester in red shades.

If required, the individual azo dyes of formulae (8) and (9) can be isolated by subsequent chromatographic separation.

Analogously to Example 1 it is possible to prepare the azo dyes listed in Tables 1 and 2, which likewise dye polyester in orange to reddish-violet shades:

TABLE 1

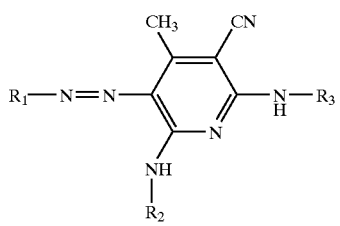

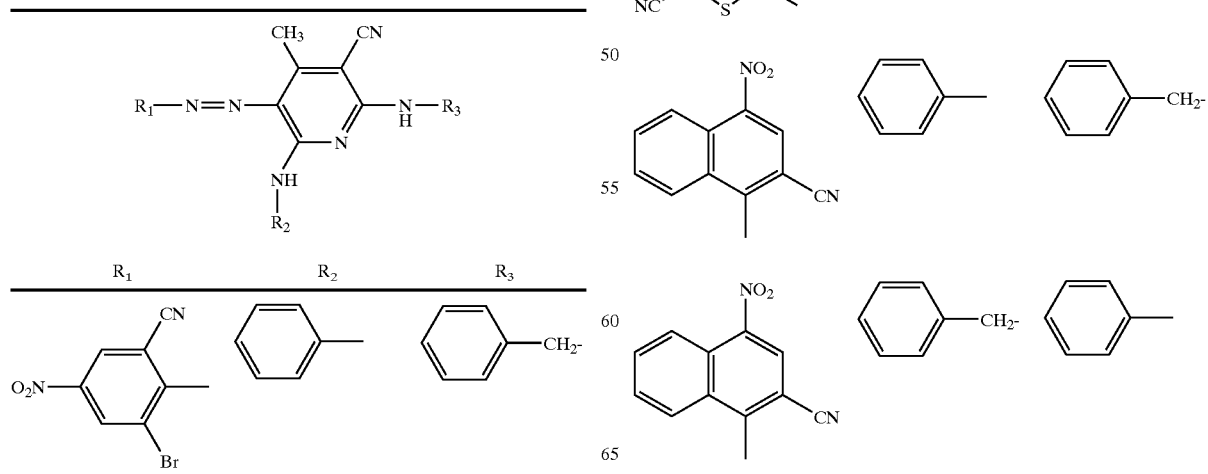

TABLE 2
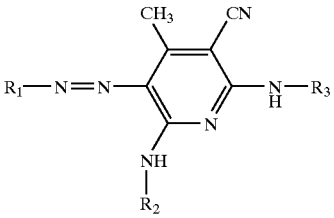
| R₁ | R₂ | R₃ |
|---|---|---|
| 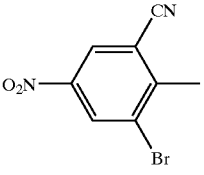 | 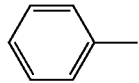 | 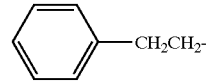 |
| 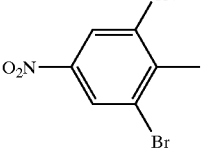 | 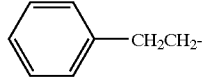 | 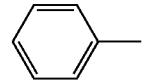 |
| 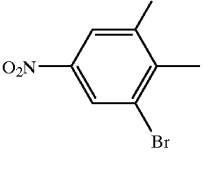 | 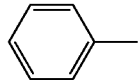 | 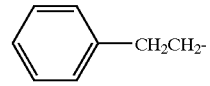 |
| 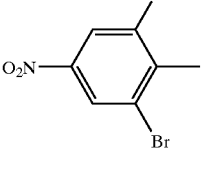 | 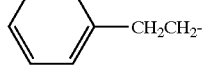 | 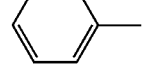 |
| 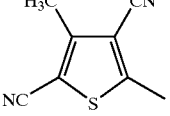 | 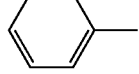 | 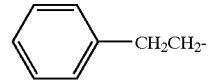 |
| 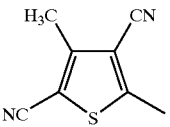 | 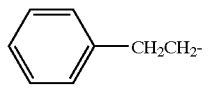 | 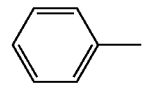 |
| 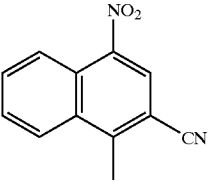 | 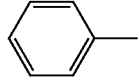 | 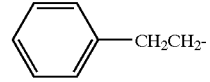 |

TABLE 2-continued

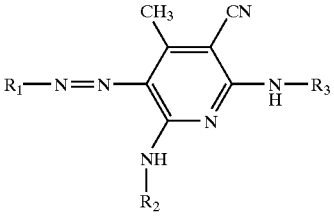

EXAMPLE 2

Using a liquor ratio of 1:20, 100 g of polyester fabric are immersed at room temperature in a liquor containing
0.07 g of a dye mixture comprising the azo dyes of formulae (2), (3), (4) and (5) in a ratio of 1:1:1:1,
0.058 g of a dye mixture comprising the dyes of formulae (10) and (11) in a ratio of 1:1, 0.57 g of a dye of formula (12),
1 g/l of ammonium sulfate and
0.5 g/l of a commercially available levelling agent, the liquor having been adjusted to a pH of 4.5 to 5 with 80% formic acid. The liquor is then heated first to 60° C. at a heating rate of 3° C./minute and then to 130° C. at a heating rate of 2° C./minute.

Dyeing is carried out at 130° C. for 60 minutes. The liquor is then cooled to 40° C. and the dyed polyester fabric is washed with water and cleaned reductively for 20 minutes at 70–80° C. in a bath containing 5 ml/l of 30% sodium hydroxide solution, 2 g/l of 85% sodium dithionite solution and 1 g/l of a commercially available detergent. The finished dyeing is then washed with water and dried.

A tinctorially strong violet dyeing having good allround properties, especially excellent high temperature light fastness properties, is obtained.

What is claimed is:

1. An azo dye of formula

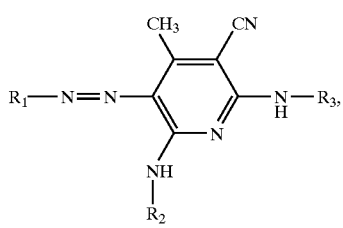

(1)

wherein
$R_1$ is 2-trifluoromethyl-4-nitrophenyl, 2-cyano-4-nitrophenyl, 2-cyano-4-nitro-6-bromophenyl, 2-trifluoromethyl-4-chlorophenyl, 3,5-dicyano-4-methyl-2-thienyl or 2-cyano-4-nitro-1-naphthyl,
$R_2$ is phenyl, benzyl or 2-phenylethyl and
$R_3$ is phenyl, benzyl or 2-phenylethyl,
with the proviso that either $R_2$ is phenyl and $R_3$ is benzyl or 2-phenylethyl or $R_3$ is phenyl and $R_2$ is benzyl or 2-phenylethyl.

2. A process for the preparation of an azo dye of formula (1) according to claim 1, wherein a compound of formula $$R_1-NH_2 \qquad (50)$$

is diazotised in accordance with a customary procedure and then coupled to a coupling component of formula

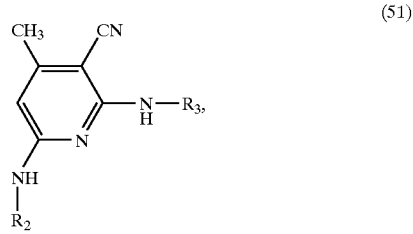

(51)

wherein $R_1$, $R_2$ and $R_3$ are as defined for formula (1).

3. A process for the dyeing or printing of semi-synthetic or synthetic hydrophobic fibre material, wherein an azo dye of formula (1) according to claim 1 is applied to the said material or is incorporated into that material.

4. A method of dyeing or printing of semi-synthetic or synthetic hydrophobic fibre materials comprising treating said materials with an azo dye of formula (1) according to claim 1.

5. A semi-synthetic or synthetic hydrophobic fibre material dyed or printed with a dye of formula (1) according to claim 1.

* * * * *

UNITED STATES PATENT AND TRADEMARK OFFICE
CERTIFICATE OF CORRECTION

PATENT NO. : 7,005,507 B2
DATED : February 28, 2006
INVENTOR(S) : Yvonne Pichler et al.

It is certified that error appears in the above-identified patent and that said Letters Patent is hereby corrected as shown below:

<u>Title page,</u>
Item [30], should read:
-- [30] Foreign Application Priority Data
Jan. 26, 2001 (EP)................01810079.2 --.

Signed and Sealed this

Thirtieth Day of May, 2006

JON W. DUDAS
*Director of the United States Patent and Trademark Office*